United States Patent
Hartenstein

(10) Patent No.: US 12,233,949 B2
(45) Date of Patent: Feb. 25, 2025

(54) VEHICLE SKID PLATE COMPRISING AT LEAST ONE LIGHTING ELEMENT

(71) Applicant: Justin Hartenstein, Metairie, LA (US)

(72) Inventor: Justin Hartenstein, Metairie, LA (US)

(73) Assignee: AAC Enterprises LLC, Metairie, LA (US)

( * ) Notice: Subject to any disclaimer, the term of this patent is extended or adjusted under 35 U.S.C. 154(b) by 331 days.

(21) Appl. No.: 17/932,081

(22) Filed: Sep. 14, 2022

(65) Prior Publication Data

US 2023/0130961 A1  Apr. 27, 2023

Related U.S. Application Data

(60) Provisional application No. 63/262,826, filed on Oct. 21, 2021.

(51) Int. Cl.
*B62D 25/20* (2006.01)
*B60Q 1/00* (2006.01)

(52) U.S. Cl.
CPC ........ *B62D 25/2072* (2013.01); *B60Q 1/0035* (2013.01)

(58) Field of Classification Search
None
See application file for complete search history.

(56) References Cited

U.S. PATENT DOCUMENTS

| 10,279,764 | B1 | 5/2019 | Wymore | |
| 11,560,087 | B1* | 1/2023 | Hartenstein | B60Q 1/0483 |
| 11,981,252 | B1* | 5/2024 | Weber | B60Q 1/0483 |
| 2016/0059774 | A1* | 3/2016 | Crandall | B60Q 1/2696 29/428 |
| 2019/0126809 | A1* | 5/2019 | Wymore | B60R 19/50 |
| 2019/0126868 | A1 | 5/2019 | Wymore | |
| 2020/0130620 | A1* | 4/2020 | Gutierrez | B62D 65/16 |
| 2020/0247311 | A1* | 8/2020 | Wehunt | F21S 41/143 |

\* cited by examiner

*Primary Examiner* — Christopher E Dunay
(74) *Attorney, Agent, or Firm* — Sisson & Banyas, Attorneys at Law, LLC; Jeffrey J. Banyas

(57) ABSTRACT

A vehicle skid plate comprises a skid plate body, at least one lighting element, and a plurality of fasteners. The skid plate body comprises at least a first section and a second section. The first section comprises an outer surface, an inner surface, at least one lighting aperture, a plurality of light fastening apertures, and at least one mounting aperture. Each lighting element is connected to the inner surface at a lighting aperture of the at least one lighting aperture by passing at least one fastener through an aperture in the lighting element and into a light fastening aperture. The skid plate body is configured to connect to a vehicle chassis by passing at least one fastener through a chassis aperture and into a mounting aperture.

20 Claims, 6 Drawing Sheets

VEHICLE SKID PLATE COMPRISING AT LEAST ONE LIGHTING ELEMENT

CROSS REFERENCES AND PRIORITIES

This application claims priority from U.S. Provisional Application No. 63/262,826 filed on 21 Oct. 2021, the teachings of which are incorporated by reference herein in their entirety.

BACKGROUND

Skid plate assemblies are configured for protecting vehicle components on an underside of a vehicle. In certain situations—such as when the vehicle is operated in an off-road environment, particularly in the evening—it may be beneficial to including a lighting source within the skid plate.

One attempt to incorporate a lighting source into a skid plate is disclosed in United States Patent Publication No. 2020/0130620 A1. This reference calls for a vehicle comprising a bumper, a plurality of frame brackets, a skid plate assembly coupled to the frame brackets, the skid plate assembly comprising a main body having a first portion, a second portion, a front surface, a rear surface, and a plurality of mounts, a light source having a first end, a second end, and a face through which light is directed, wherein the skid plate assembly extends below the bumper, wherein the front surface of the main body defines an opening that exposes the light source, and wherein when the vehicle is on a horizontal surface, the face of the light source is aimed forward and downward at a first angle of 60 degrees or less from horizontal.

Another attempt to incorporate a lighting source into a skid plate is disclosed in U.S. Pat. No. 10,279,764 B1. In this reference, the skid plate front portion may define an aperture extending through the skid plate, and adjacent receiving brackets formed on the skid plate rear surface, for mounting a fixture to the skid plate proximate the aperture and extending rearwardly therefrom. A light fixture, sensor assembly, or other device may be disposed within the aperture.

In practice, the skid plates disclosed in both US 2020/0130620 A1 and U.S. Pat. No. 10,279,764 B1 suffer from several drawback. Most notably, each requires a complex system of brackets both for connecting the lighting source to the skid plate and for connecting the skid plate to the vehicle. These brackets add to the complexity of assembly, increase production costs, and provide a potential point of failure for the skid plate.

In addition, both US 2020/0130620 A1 and U.S. Ser. No. 10/279,764 B1 utilize one or two elongated lighting sources—commonly referred to as light bars—comprising a plurality of individual lighting elements located therein. While commonly used in automotive applications, these light bars do not allow for replacement or repair of individual lighting elements that may suffer damage or burn out. Instead, the entire light bar assembly requires replacement upon damage or burn out.

The need exists, therefore, for an improved skid plate incorporating a lighting source.

SUMMARY

Disclosed herein is a vehicle skid plate. The vehicle skid plate comprises a skid plate body, at least one lighting element, and a plurality of fasteners. The skid plate body comprises a first section and a second section. The first section comprises an outer surface, an inner surface, at least one lighting aperture, a plurality of light fastening apertures, and at least one mounting aperture. The second section extends from a first section first edge at a first angle.

Each lighting element is connected to the inner surface at a lighting aperture of the at least one lighting aperture by passing at least one fastener of the plurality of fasteners through an aperture in the lighting element and into a light fastening aperture of the plurality of light fastening apertures. The skid plate body is configured to connect to a vehicle chassis by passing at least one fastener of the plurality of fasteners through a chassis aperture and into a mounting aperture of the at least one mounting aperture.

In some embodiments, the first section may be configured at a second angle. The second angle may be substantially perpendicular to a plane that is parallel to ground when the skid plate body is connected to a vehicle chassis.

In certain embodiments, the at least one lighting element may comprise at least one light emitting diode (LED). In some embodiments, the at least one lighting element may comprise a plurality of lighting elements. In some such embodiments, each lighting element of the plurality of lighting elements may comprise at least one light emitting diode.

When used, the at least one light emitting diode may comprise a cluster of three horizontally arranged pairs of light emitting diodes wired in parallel. In some embodiments, the at least one light emitting diode may be accentuated through a lens optic.

In certain embodiments, each lighting element may comprise an electric communication connection. When present, the electric communication connection may be configured to connect to an external power source. In some embodiments, the external power source may be a vehicle battery.

In some embodiments, at least one light fastening aperture of the plurality of light fastening apertures may pass from the outer surface through the inner surface. In certain such embodiments, each light fastening aperture of the plurality of light fastening apertures may pass from the outer surface through the inner surface.

In other embodiments, at least one light fastening aperture of the plurality of light fastening apertures may originate from the inner surface without passing through the outer surface. In some such embodiments, each light fastening aperture of the plurality of light fastening apertures may originate from the inner surface without passing through the outer surface. In some embodiments, the light fastening aperture(s) which originate from the inner surface without passing through the outer surface may be threaded.

In certain embodiments, at least one mounting aperture of the at least one mounting aperture may pass from the outer surface through the inner surface. In some such embodiments, each mounting aperture of the at least one mounting aperture may pass from the outer surface through the inner surface.

In other embodiment, at least one mounting aperture of the at least one mounting aperture may originate from the inner surface without passing through the outer surface. In certain such embodiments, each mounting aperture of the at least one mounting aperture may originate from the inner surface without passing through the outer surface. In some embodiments, the mounting aperture(s) which originate from the inner surface without passing through the outer surface may be threaded.

In some embodiments, the vehicle skid plate may further comprise a plurality of spacers. When used, at least one spacer of the plurality of spacers may be located between one individual lighting element of the at least one lighting element and the inner surface of the first section.

In certain embodiments, the first angle may be in a range of between 90° and 175°.

In some embodiments, the vehicle skid plate may further comprise a third section. When present, the third section may extend from a first section second edge at a third angle in a second direction opposite a first direction from which the second section extends from the first section first edge. In some such embodiments, the third angle may be in a range of between 75° and 105°.

In certain embodiments, the skid plate body may be constructed of steel. In some embodiments, the skid plate body may have an average thickness of about 0.1875 inches.

DETAILED DESCRIPTION

Disclosed herein is a vehicle skid plate. The vehicle skid plate is described below with reference to the Figures. As described herein and in the claims, the following numbers refer to the following structures as noted in the Figures.

5 refers to a vehicle chassis.
7 refers to a chassis aperture.
10 refers to a vehicle skid plate.
100 refers to a skid plate body.
110 refers to a first section.
111 refers to an outer surface.
112 refers to an inner surface.
113 refers to a lighting aperture.
114 refers to a light fastening aperture.
115 refers to a mounting aperture.
116 refers to a first section first edge.
117 refers to a second angle (measured between the first section and ground).
118 refers to a first section second edge.
120 refers to a second section.
125 refers to a first angle (measured between the first section and the second section).
130 refers to a third section.
135 refers to a third angle (measured between the first section and the third section).
200 refers to a lighting element.
210 refers to an aperture.
220 refers to a horizontally arranged pair of light emitting diodes.
230 refers to a lens optic.
240 refers to an electric communication connection.
250 refers to an external power source.
260 refers to a heat sink.
300 refers to a fastener.
400 refers to a spacer.

Figure 1:
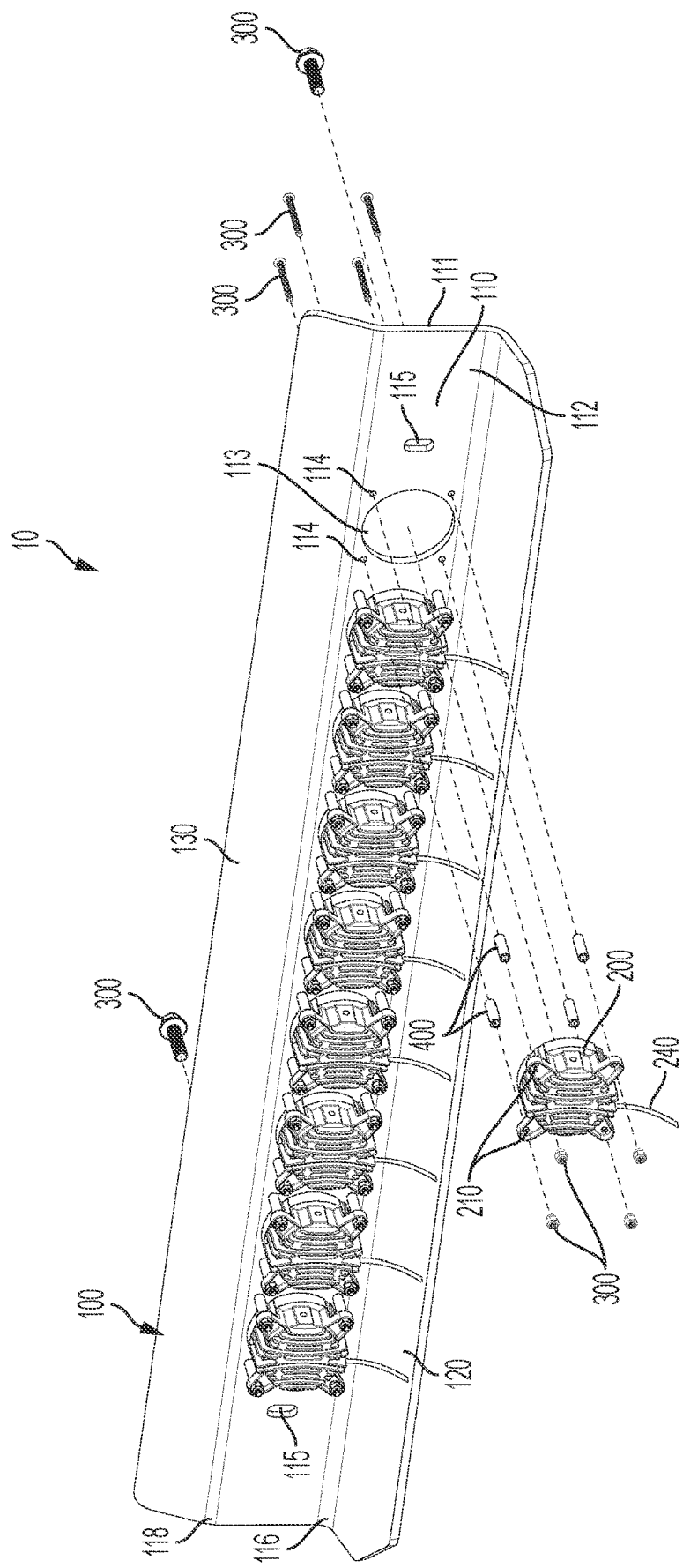
FIG. 1 is a partially exploded perspective view of the rear of an embodiment of a skid plate for a vehicle.
Figure 2:
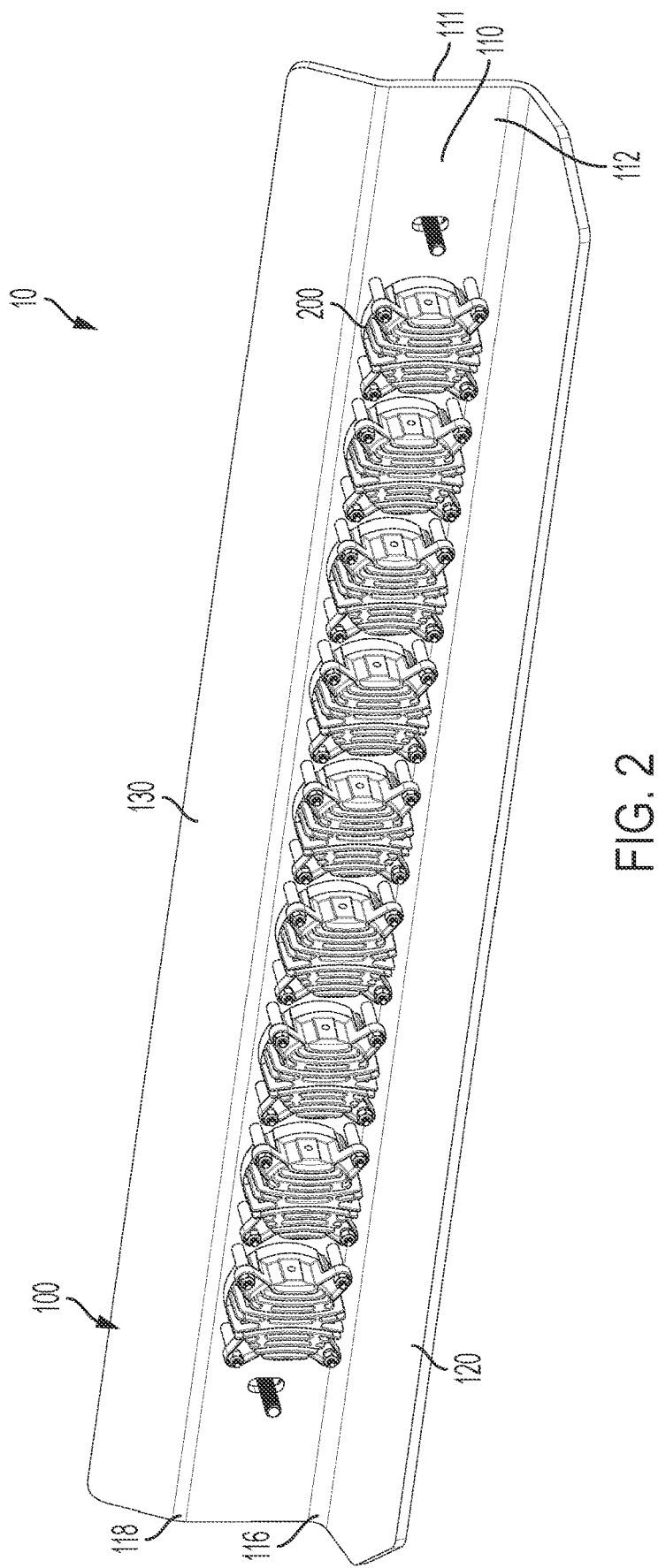
FIG. 2 is an assembled perspective view of the embodiment of the skid plate of FIG. 1.

FIG. 1 and FIG. 2 depict an embodiment of a vehicle skid plate (10) with FIG. 1 showing the embodiment of the vehicle skid plate in a partially exploded perspective view and FIG. 2 showing the embodiment of the vehicle skid plate in an assembled perspective view. As shown in FIG. 1 and FIG. 2, the vehicle skid plate comprises a skid plate body (100), at least one lighting element (200) which may be a plurality of lighting elements, and a plurality of fasteners (300).

The skid plate body (100) comprises at least a first section (110) and a second section (120). As shown in FIG. 1, the first section comprises at least an outer surface (111) and an inner surface (112) which is opposite the outer surface. The first section also comprises at least a first section first edge (116) and a first section second edge (118) which is opposite the first section first edge.

The first section (110) also comprises at least one lighting aperture (113). In some embodiments, the at least one lighting aperture comprises a plurality of lighting apertures. In some embodiments, one or more—preferably all—of the lighting aperture(s) pass through the first section from the outer surface (111) through the inner surface (112). That is to say that the lighting aperture(s) may each be characterized as a through hole in the first section. While FIG. 1 shows the lighting aperture(s) having a substantially circular or circular shape, other shapes may be utilized including a triangle, a polygonal shape (such as a square or rectangle), a heptagon, a hexagon, an octagon, an oval, an ellipse, or an oblong oval (such as two semicircles joined by a rectangle). In practice, the size and shape of each lighting aperture will depend upon a number of factors including—but not limited to—the size and shape of the individual lighting element intended for connection to the skid plate body at the lighting aperture in question.

The first section (110) also comprises a plurality of light fastening apertures (114). In some embodiments, one or more—preferably all—of the plurality of light fastening apertures pass through the first section from the outer surface (111) through the inner surface (112). That is to say that one or more—preferably all—of the light fastening apertures may be characterized as a through hole in the first section. In other embodiments, one or more—preferably all—of the plurality of light fastening apertures may originate from the inner surface without passing through the outer surface. That is to say that one or more—preferably all—of the light fastening apertures may be characterized as a blind hole in the first section. When one or more of the light fastening apertures is a blind hole in the first section, the light fastening aperture will preferably be threaded to receive a threaded fastener such as a bolt or screw. Each light fastening aperture may have a substantially circular or circular shape. In preferred embodiments, each lighting aperture (113) will have at least one light fastening aperture (s) disposed about the perimeter of the lighting aperture as shown in FIG. 1. The number of light fastening aperture(s) disposed around the perimeter of any one lighting aperture may be selected from the group consisting of at least one, at least two, at least three, and at least four.

The first section (110) also comprises at least one mounting aperture (115). In some embodiments, one or more—preferably all—of the mounting apertures will pass through the first section from the outer surface (111) through the inner surface (112). That is to say that one or more—preferably all—of the mounting apertures may be characterized as a through hole in the first section. In other embodiments, one or more—preferably all—of the mounting apertures may originate from the inner surface without passing through the outer surface. That is to say that one or more—preferably all—of the mounting aperture(s) may be characterized as a blind hole in the first section. Preferably, when one or more of the mounting apertures is a blind hole in the first section, the aperture will be threaded to receive a threaded fastener such as a bolt or screw. Each mounting aperture may have a substantially circular or circular shape.

Figure 5:
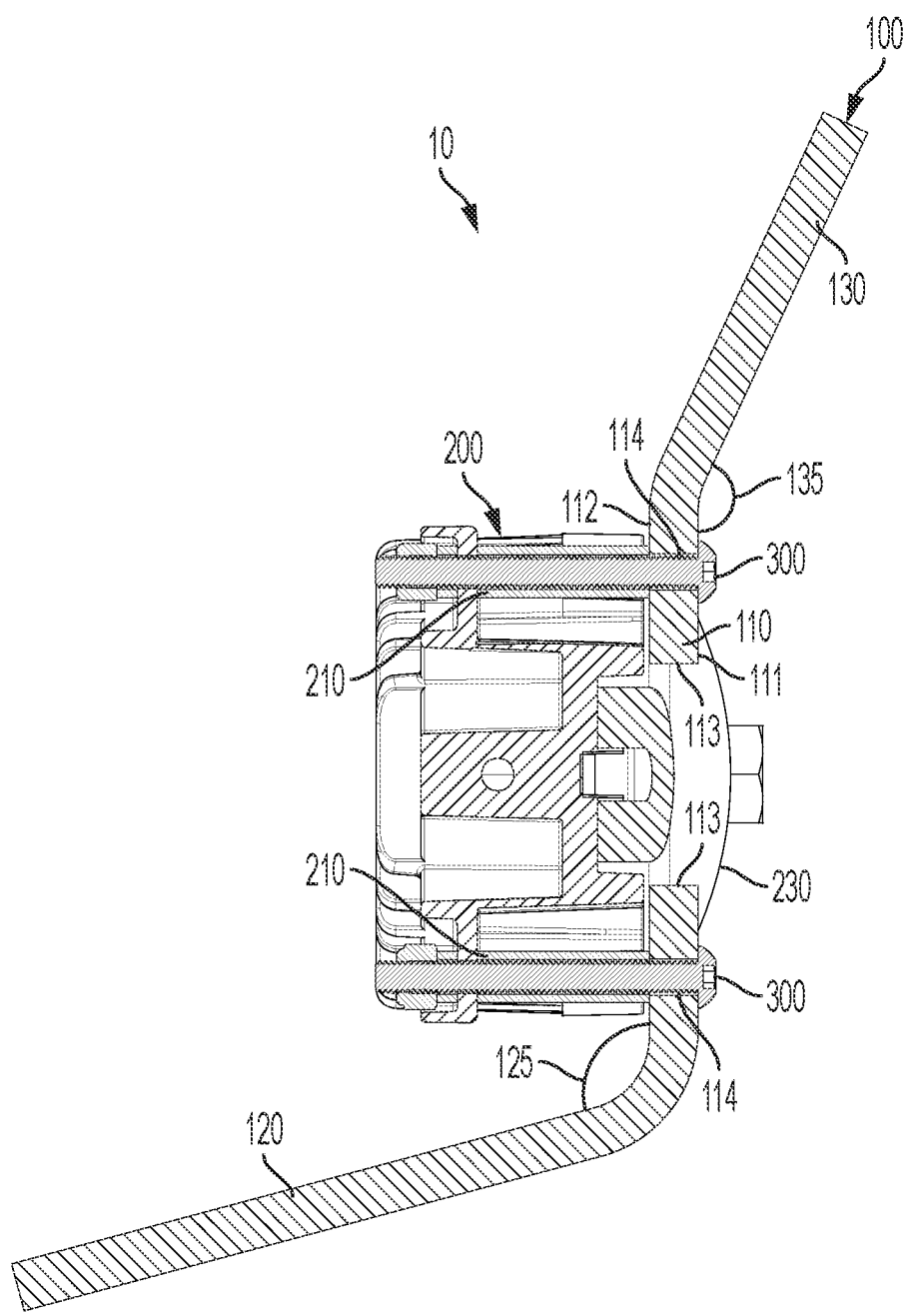
FIG. 5 is a cut-away view of an embodiment of a lighting element connected to a skid plate body.

As shown in FIG. 1, the second section (120) extends from the first section first edge (116). As such, a first angle (125 as shown in FIG. 5) is formed between the second section and the first section. This first angle—measured from the inner surface (112) of the first section (110) to the inner surface of the second section (120)—may be in a range selected from the group consisting of between 90° and 175°, between 90° and 155°, between 90° and 135°, between 90° and 115°, between 115° and 175°, between 115° and 155°, between 115° and 135°, between 135° and 175°, between 135° and 155°, and between 155° and 175°.

In some embodiments—such as those shown in FIG. 1 and FIG. 2—the skid plate body (100) may further comprise a third section (130). When present, the third section may extend from the first section second edge (118). As such, a third angle (135 as shown in FIG. 5) is formed between the third section and the first section. This third angle—measured from the outer surface (111) of the first section (110) to the outer surface of the third section such that the third angle is in a direction opposite a first direction from which the second section extends from the first section first edge—may be in a range selected from the group consisting of between 75° and 105°, between 75° and 100°, between 75° and 95°, between 80° and 105°, between 80° and 100°, between 80° and 95°, between 85° and 105°, between 85° and 100°, and between 85° and 95°.

The skid plate body (100) may be constructed of a number of different rigid materials. Preferred materials include metals (steel, stainless steel, aluminum, cast iron, ductile iron, etc.) and composite plastic materials (fiber-reinforced polymers). The skid plate body will have an average thickness which may be measured across the first section. Preferably the average thickness will be about 0.1875 inches. However, the average thickness may also be in a range selected from the group consisting of between 0.100 inches and 0.400 inches, between 0.100 inches and 0.300 inches, between 0.100 inches and 0.200 inches, between 0.200 inches and 0.400 inches, between 0.200 inches and 0.300 inches, and between 0.300 inches and 0.400 inches.

The at least one lighting element (200) may comprise one or more lighting elements any of which are commonly used on vehicle applications. Common lighting elements include halogen lamps and light emitting diodes (LEDs). While halogen lamps may be used, LEDs are considered a preferred embodiment of a lighting element. In embodiments comprising a plurality of lighting elements, preferably, each lighting element will be of the same type of lighting element (i.e.—all lighting elements being halogen lamps or all lighting elements being LEDs). However, in certain embodiments, the plurality of lighting elements may comprise a mixture of two or more different types of lighting elements.

Figure 3:
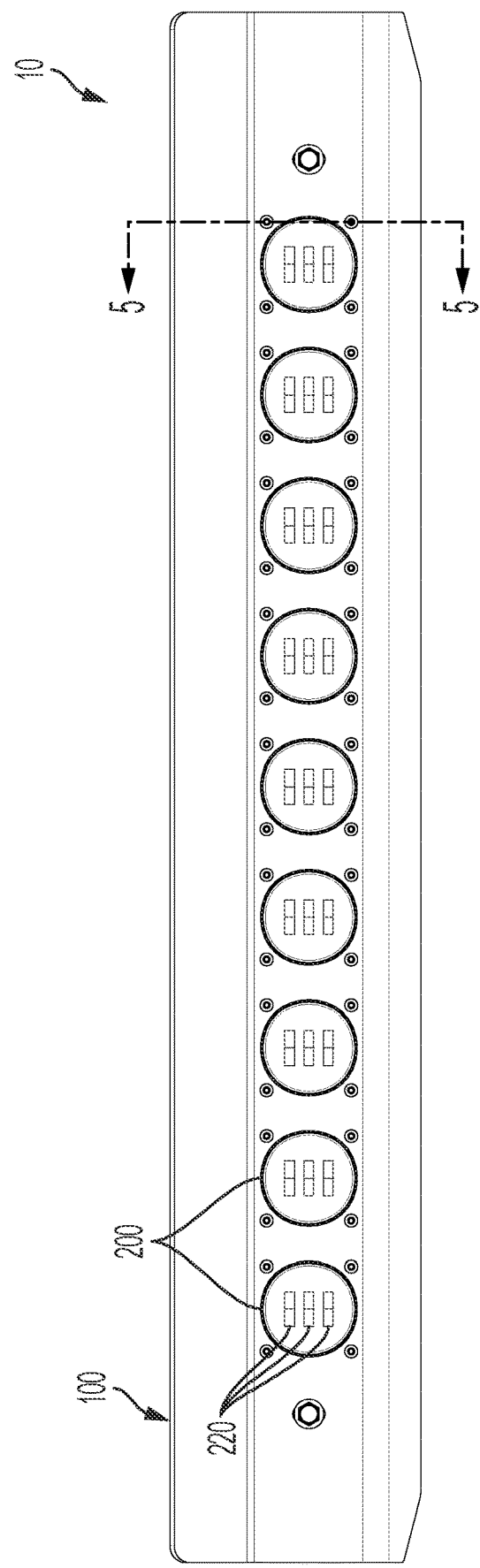
FIG. 3 is a front view of an assembled embodiment of a skid plate for a vehicle.

FIG. 3 shows a front view of an assembled vehicle skid plate (10). As shown in FIG. 3, one preferred example of an LED lighting element which may be used as one or more of the lighting element(s) comprises a cluster of three horizontally arranged pairs of light emitting diodes (220). When used, the cluster of three horizontally arranged pairs of LEDs are preferably wired in parallel. LEDs, including the cluster of three horizontally arranged pairs of LEDs wired in parallel as shown in FIG. 3 may also be accentuated through a lens optic (230 as shown in FIG. 5) that produces a focus and redirection of light.

Figure 4:
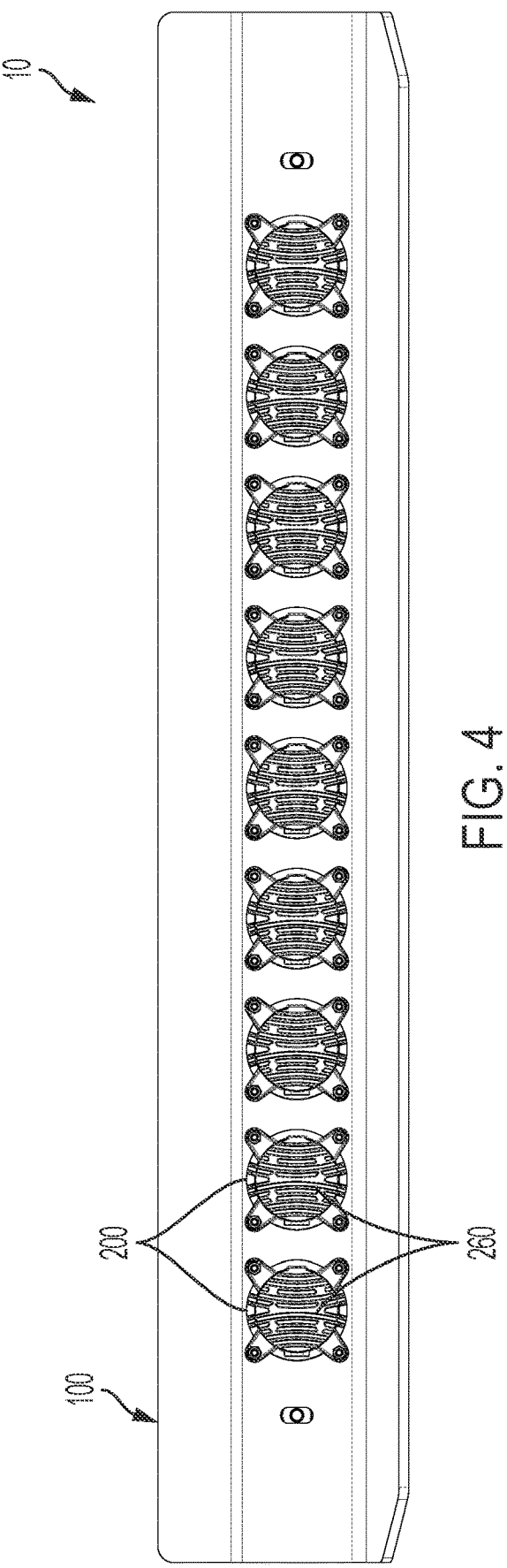
FIG. 4 is a rear view of an assembled embodiment of a skid plate for a vehicle.

FIG. 4 shows a rear view of an assembled vehicle skid plate (10). As shown in FIG. 4, in some embodiments, one or more—preferably each—of the lighting element(s) (200) may further comprise at least one heat sink (260) on the rear exposed surface. When used, the heat sink may mitigate the propagation and buildup of heat from the lighting element.

Preferably, one or more—preferably each—of the lighting element(s) (200) will be sealed and waterproofed. When sealed and waterproofed, damage to the lighting element caused by oncoming precipitation may be mitigated. Sealing and waterproofing may be accomplished—or assisted—by embedding the lighting element(s) under a domed or convex cover that may also serve to further accentuate the illumination produced by the lighting element.

Each fastener of the plurality of fasteners (300) may be selected from the group consisting of a bolt (with or without a nut), a screw, a rivet, a clip, a clamp, and the like. A bolt (with or without a nut) or a screw is a preferred fastener for connecting the lighting elements (200) to the inner surface (112) of the first section (110) as shown in FIG. 2. A bolt (with or without a nut) is also a preferred fastener for connecting the skid plate body (100) to the vehicle chassis (5).

In some embodiments, one or more of the plurality of fasteners (300) may pass through a spacer of a plurality of spacers (400) as shown in FIG. 1 and FIG. 2. When used, each spacer of the plurality of spacers may be of a cylindrical profile and may be manufactured of a variety of rigid materials including metals (i.e.—aluminum, stainless steel), rigid polymers (i.e.—high density polyethylene (HDPE), polyamides), and composite plastic materials (i.e.—fiber-reinforced polymers). Once assembled, at least one spacer of the plurality of spacers may be located between one individual lighting element of the plurality of lighting elements (200) and the inner surface (112) of the first section (110).

FIG. 5 shows a cut-away view of a lighting element (200) connected to the inner surface (112) of a first section (110) of a skid plate body (100). As shown in FIG. 5, the lighting element is connected to the inner surface by passing one or more fasteners of the plurality of fasteners (300) through the aperture (210) in the lighting element. In the embodiment shown in FIG. 5, the fastener comprises a bolt with a nut. The fastener then passes into or through a corresponding light fastening aperture (114) in the first section. In the embodiment shown in FIG. 5, the fastener comprising a bolt passes through the light fastening aperture with the corresponding nut connected to the bolt.

Before passing through the light fastening aperture (114), the fastener (300)—which in this case is a bolt—may also pass through the spacer (400 as shown in FIG. 1 and FIG. 2). The spacer(s) may be used to adjust the position and orientation of the lighting element. For instance, in some embodiments the spacer(s) may be of a length such that no portion of the lighting element passes into or through the lighting apertures (113). In other embodiments—such as shown in FIG. 5—the spacer(s) may be shorter such that a portion of the lighting element passes into—or even through—the lighting aperture. By into the lighting aperture it is meant that a portion of the lighting element is located within the lighting aperture between the outer surface (111) and the inner surface (112), but does not of necessity extend past the outer surface. By through the lighting aperture it is meant that a portion of the lighting element extends past the outer surface.

Figure 6:
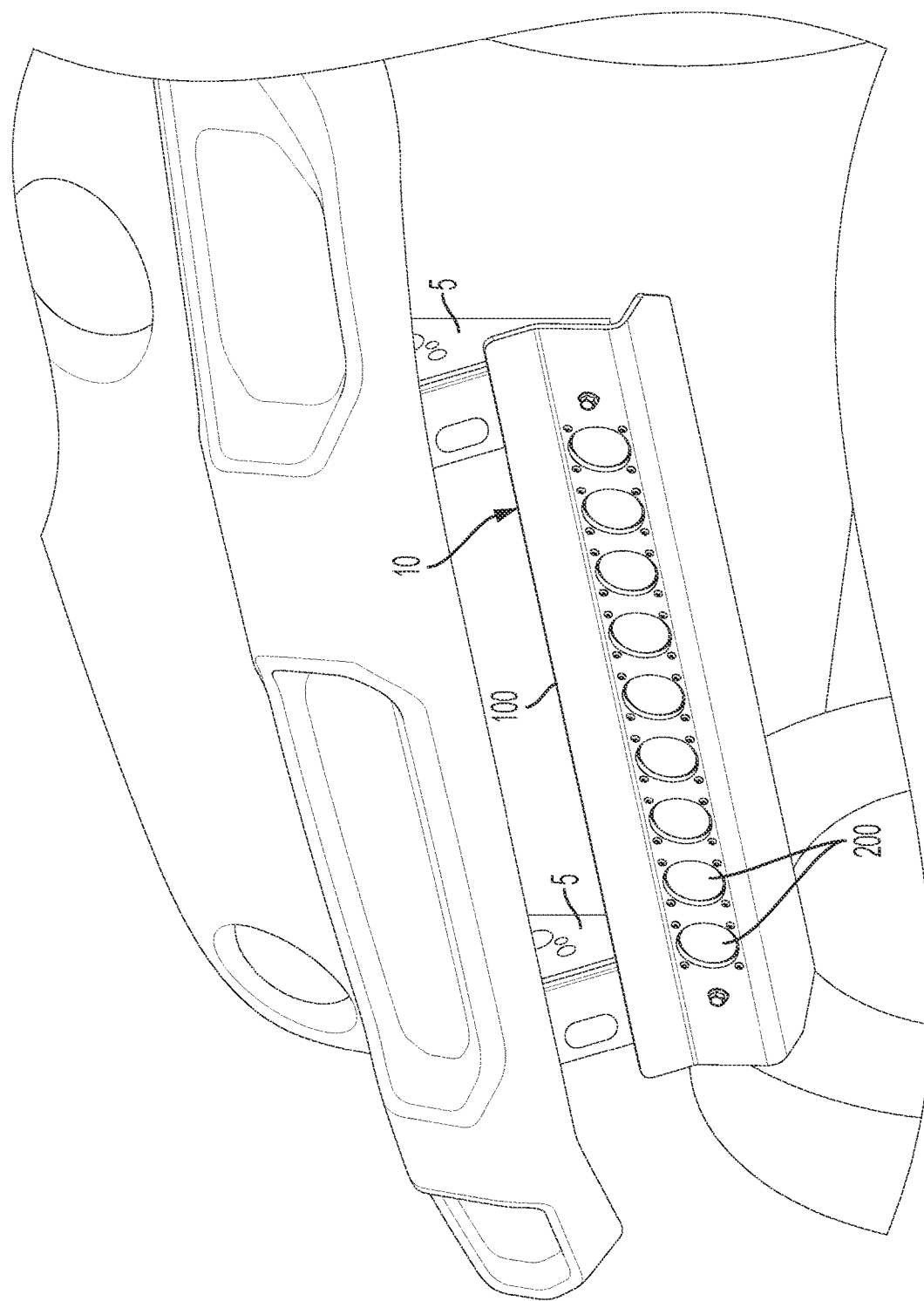
FIG. 6 is a perspective view of an embodiment of a skid plate connected to a vehicle.
Figure 7:
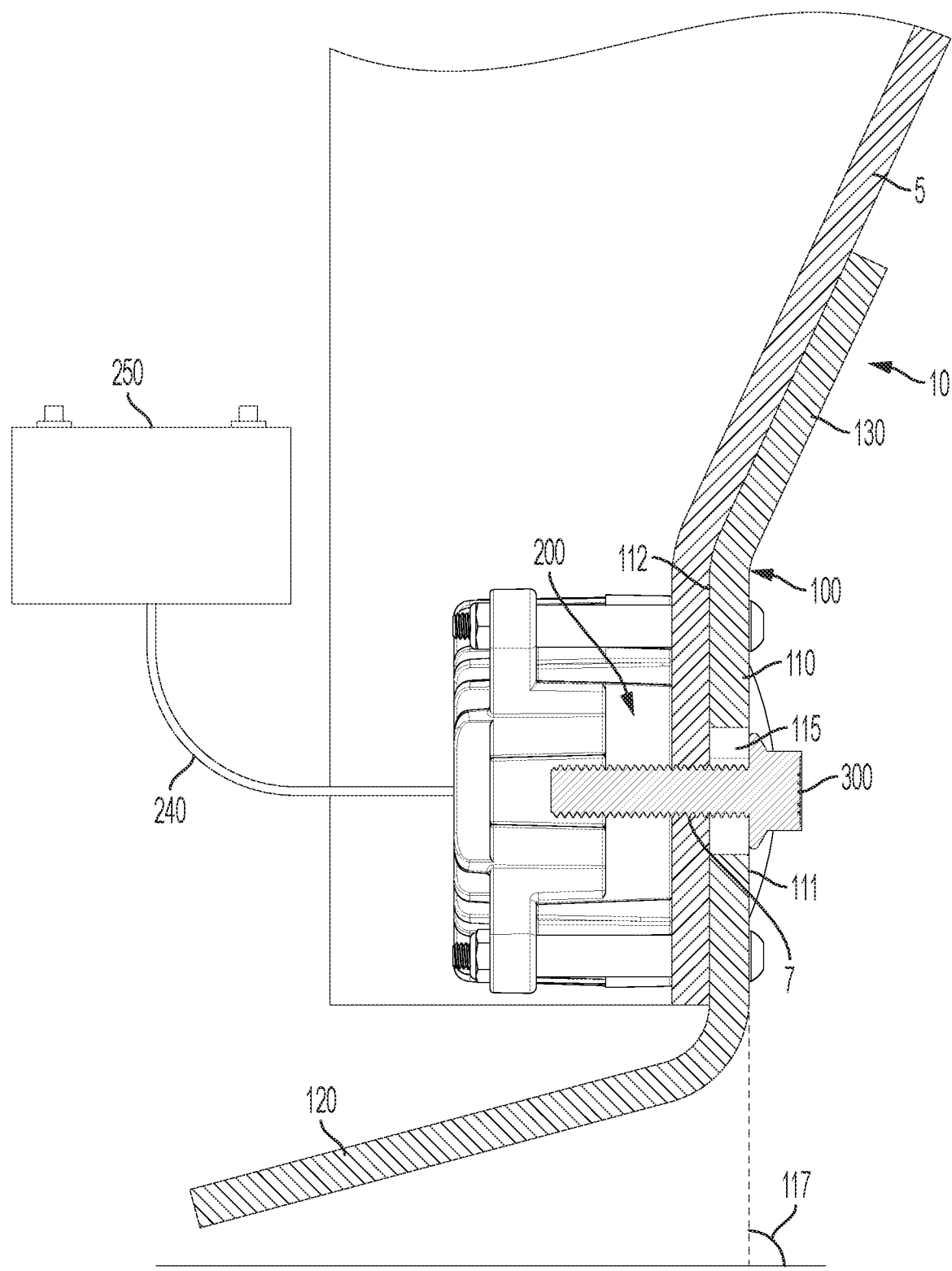
FIG. 7 is a cut-away side view of an embodiment of a vehicle skid plate body connected to a vehicle chassis.

FIG. 6 shows a perspective view of a portion of a vehicle (in this case a portion of the front facia of a vehicle) with a vehicle skid plate (10) connected thereto. The vehicle may comprise a vehicle chassis (5 as shown in FIG. 7) having a plurality of brackets. Preferably, the vehicle skid plate will be connected to one or more of the plurality of brackets such that the vehicle skid plate extends below the vehicle's bumper.

FIG. 7 shows a cross section view of a vehicle skid plate (10) connected to a vehicle chassis (5). As shown in FIG. 7, the vehicle chassis comprises at least one bracket, said bracket comprising at least one chassis aperture (7). The skid plate body is configured to connect to the vehicle chassis by passing at least one fastener of the plurality of fasteners (300) through a chassis aperture and into a mounting aperture of the at least one mounting aperture (115). Preferably, the skid plate body will be configured to connect to the vehicle chassis by individually passing at least one fastener (at least two fasteners in total) of the plurality of fasteners through separate chassis apertures (at least two chassis apertures in total) and into separate mounting apertures (at least two mounting apertures in total).

Once the skid plate body (100) is connected to the vehicle chassis (5), the first section will form a second angle (117) relative to a plane that is parallel to the ground with which the vehicle's tires are in contact. Preferably, the second angle will be substantially perpendicular to or perpendicular to the plane that is parallel to the ground. However, in some embodiments, the second angle may be in a range selected from the group consisting of between 70° and 110°, between 70° and 100°, between 80° and 110°, and between 80° and 100°. By configuring the second angle substantially perpendicular to or perpendicular to the plane that is parallel to the ground, the lighting elements may then be configured to project light substantially parallel to or parallel to the ground.

FIG. 7 also shows the lighting element(s) (200) comprising an electric communication connection (240). The electric communication connection may comprise a plurality of wires electrically connected at a first end to the lighting element and at a second end to a connector. The type and configuration of connector will depend upon a number of different variables including the intended use for the lighting element(s) and the intended effect of the lighting element(s). The connector may then be connected to an external power source (250). One preferred embodiment of an external power source may be a vehicle battery. A switch (not shown) located within the vehicle's interior may then allow a vehicle operator to turn on the lighting element(s) by turning the switch to a switch on position in which a circuit between the external power source and the lighting element(s) is closed. The vehicle operator may then turn off the lighting element(s) by turning the switch to a switch off position in which the circuit between the external power source and the lighting element(s) is opened.

By connecting the lighting element(s) directly to the inner surface of the skid plate body, the present invention eliminates the complex system of brackets for connecting the lighting elements to the skid plate body seen in the prior art. Similarly, by connecting the first section of the skid plate body directly to the vehicle chassis, additional brackets may be eliminated. Eliminating these brackets reduces production cost as well as potential part failure points.

Additionally, in embodiments utilizing a plurality of lighting elements, each of which is individually connected to the skid plate body, the present invention results in a more modular structure in which lighting element(s) can be added, removed, replaced, or repaired individually. This is in contrast to the prior art light bar embodiments which require repair or replacement of the entire light bar in the event of damage or burn out.

What is claimed is:

1. A vehicle skid plate (10) comprising:
a skid plate body (100) comprising:
a first section (110) comprising an outer surface (111), an inner surface (112), at least one lighting aperture (113), a plurality of light fastening apertures (114), and at least one mounting aperture (115), and
a second section (120) extending from a first section first edge (116) at a first angle (125);
at least one lighting element (200); and
a plurality of fasteners (300); and
wherein each lighting element is connected to the inner surface at a lighting aperture of the at least one lighting aperture by passing at least one fastener of the plurality of fasteners through an aperture (210) in the lighting element and into a light fastening aperture of the plurality of light fastening apertures; and
wherein the skid plate body is configured to connect to a vehicle chassis (5) by passing at least one fastener of the plurality of fasteners through a chassis aperture (7) and into a mounting aperture of the at least one mounting aperture.

2. The vehicle skid plate of claim 1, wherein the first section is configured at a second angle (117) which is substantially perpendicular to a plane that is parallel to ground when the skid plate body is connected to a vehicle chassis.

3. The vehicle skid plate of claim 1, wherein the at least one lighting element comprises at least one light emitting diode (LED).

4. The vehicle skid plate of claim 3, wherein the at least one light emitting diode comprises a cluster of three horizontally arranged pairs of light emitting diodes (220) wired in parallel.

5. The vehicle skid plate of claim 3, wherein the at least one light emitting diode is accentuated through a lens optic (230).

6. The vehicle skid plate of claim 1, wherein the at least one lighting element comprises a plurality of lighting elements.

7. The vehicle skid plate of claim 1, wherein each lighting element comprises an electric communication connection (240) configured to connect to an external power source (250).

8. The vehicle skid plate of claim 7, wherein the external power source is a vehicle battery.

9. The vehicle skid plate of claim 1, wherein at least one light fastening aperture of the plurality of light fastening apertures passes from the outer surface through the inner surface.

10. The vehicle skid plate of claim 1, wherein at least one light fastening aperture of the plurality of light fastening apertures originates from the inner surface without passing through the outer surface.

11. The vehicle skid plate of claim 10, wherein the light fastening aperture(s) which originate from the inner surface without passing through the outer surface are threaded.

12. The vehicle skid plate of claim 1, wherein at least one mounting aperture of the at least one mounting aperture passes from the outer surface through the inner surface.

13. The vehicle skid plate of claim 1, wherein at least one mounting aperture of the at least one mounting aperture originates from the inner surface without passing through the outer surface.

14. The vehicle skid plate of claim 13, wherein the mounting aperture(s) which originate from the inner surface without passing through the outer surface are threaded.

15. The vehicle skid plate of claim 1, further comprising a plurality of spacers (400) with at least one spacer of the plurality of spacers located between one individual lighting element of the at least one lighting element and the inner surface of the first section.

16. The vehicle skid plate of claim 1, wherein the first angle is in a range of between 90° and 175°.

17. The vehicle skid plate of claim 1, further comprising a third section (130) extending from a first section second edge (118) at a third angle (135) in a second direction opposite a first direction from which the second section extends from the first section first edge.

18. The vehicle skid plate of claim 17, wherein the third angle is in a range of between 75° and 105°.

19. The vehicle skid plate of claim 1, wherein the skid plate body is constructed of steel.

20. The vehicle skid plate of claim 1, wherein the skid plate body has an average thickness of about 0.1875 inches.

\* \* \* \* \*